United States Patent [19]

Sage et al.

[11] Patent Number: 5,190,688
[45] Date of Patent: Mar. 2, 1993

[54] LIQUID CRYSTALLINE MIXTURE

[75] Inventors: Ian C. Sage, Broadstone; Stephen J. Lewis, Bournemouth; Dominic Chaplin, Bromley, all of Great Britain

[73] Assignee: Merck Patent Gesellschaft mit Beschrankter Haftung, Darmstadt, Fed. Rep. of Germany

[21] Appl. No.: 255,165

[22] PCT Filed: Jan. 25, 1988

[86] PCT No.: PCT/EP88/00048

§ 371 Date: Sep. 30, 1988

§ 102(e) Date: Sep. 30, 1988

[87] PCT Pub. No.: WO88/05803

PCT Pub. Date: Aug. 11, 1988

[30] Foreign Application Priority Data

Jan. 30, 1987 [GB] United Kingdom ............... 8702126

[51] Int. Cl.$^5$ ............... C09K 19/52; C09K 19/34; C09K 19/06; C09K 19/30
[52] U.S. Cl. ............... 252/299.01; 252/299.6; 252/299.61; 252/299.63; 252/299.65; 252/299.66; 252/299.67; 252/299.2; 252/299.68
[58] Field of Search ............... 560/125, 184, 227; 252/299.2, 299.61, 299.63, 299.66, 299.62, 299.67, 299.68

[56] References Cited

U.S. PATENT DOCUMENTS

| | | | |
|---|---|---|---|
| 4,346,235 | 8/1982 | Sonoda et al. | 560/227 X |
| 4,686,289 | 8/1987 | Huynh-Ba et al. | 252/299.61 X |
| 4,871,469 | 10/1989 | Reiffenrath et al. | 252/299.61 |
| 4,871,472 | 10/1989 | Krause et al. | 252/299.65 |
| 4,886,619 | 12/1989 | Janulis | 252/299.1 |

FOREIGN PATENT DOCUMENTS

| | | | |
|---|---|---|---|
| 0181601 | 5/1986 | European Pat. Off. | 252/299.68 |
| 1307781 | 2/1973 | United Kingdom | 560/125 |

*Primary Examiner*—Robert L. Stoll
*Assistant Examiner*—C. Harris
*Attorney, Agent, or Firm*—Millen, White, Zelano and Branigan

[57] ABSTRACT

This invention relates to liquid crystalline mixtures with at least two liquid-crystalline compounds which are free of perfluoro alkylene groups and at least one partially fluorinated additive of formula I $$R^1-(CH_2)_m-(CF_2)_n-R^2 \qquad \text{I}$$

wherein $R^1$, $R^2$, m and n have the meanings indicated in patent claim 1, and to a means of reducing the refractive indices of a liquid crystalline mixture by adding one or more partially fluorinated additives of formula I.

16 Claims, No Drawings

LIQUID CRYSTALLINE MIXTURE

This invention relates to liquid crystalline mixtures with at least two liquid-crystalline compounds which are free of perfluoro alkylene groups and at least one partially fluorinated additive of formula I $$R^1-(CH_2)_m-(CF_2)_n-R^2 \qquad I$$

wherein m is 0 to 12, n is 1 to 16 and $R^1$ and $R^2$ each signify a group of formula $$R-(A^1-Z^1)_p-(A^2)_q-Z^2-$$

in which
R is F or alkyl with 1–15 C atoms, it also being possible for one or two non-adjacent $CH_2$ groups to be replaced by —O—, —CO—, —O—CO—, —CO—O—, —O—CO—O—, —C≡C— and/or —CH=CH—,
$A^1$ and $A^2$ are in each case an unsubstituted or mono- or polysubstituted 1,4-cyclohexylene group, it also being possible for one or two non-adjacent $CH_2$ groups to be replaced by —O— and/or —S—, or denote a 1,4-bicyclo-[2,2,2]octylene group, or a 1,4-phenylene group which is unsubstituted or substituted by one or two F and/or Cl atoms and/or $CH_3$ groups and/or CN groups, it also being possible for one or two CH groups to be replaced by N,
$Z^1$ denotes —CO—O—, —O—CO—, —$CH_2CH_2$—, —CHCN—$CH_2$—, —$CH_2$—CHCN—, —CH=CH—, —C≡C—, —$OCH_2$—, —$CH_2O$—, —CH=N—, —N=CH—, —N=N—, —NO=N—, —N=NO—or a single bond,
$Z^2$ denotes —CO—O—, —O—CO—, —$CH_2CH_2$—, —CHCN—$CH_2$—, —$CH_2$—CHCN—, —CH=CH—, —C≡C—, —$OCH_2$—, —$CH_2O$—, —CH=N—, —N=CH—, —N=N—, —NO=N—, —N=NO—, —$(CH_2)_k$—CO—O— or a single bond,
k is 1 to 6,
p is 0, 1 or 2, and
q is 0 or 1,
one of the groups $R^1$ and $R^2$ may also denote H, with the proviso that the sum of m+p+q equals 1 to 15,
and in particular means whereby liquid crystalline mixtures can be provided having refractive indices tailored to optimal values for practical applications.

Liquid crystal phases are commonly exhibited by organic compounds having extended rod-like molecules, and are characterised in their liquid crystalline state by a degree of order intermediate between those of a crystalline solid and of an isotropic liquid respectively. The wide spread use of liquid crystalline materials in electrooptic devices arises from their combination of fluid like flow with an anisotropy of their physical properties that is typical of a crystalline material. When a liquid crystal material is utilised in an electro-optic device, optimal performance can only be obtained when the physical properties of the material are adjusted to extreme or optimal values to suit the particular application and device geometry in use. Examples of the physical properties which may beneficially be changed to improve the utility of a liquid crystalline material for a particular application include such properties as the mesogenic phase range, the dielectric constants, the elastic constants, the viscosity coefficients, and the refractive indices of the material.

Means is now provided by the present invention for the adjustment of the refractive indices of a liquid crystal by addition of one or more partially fluorinated additives which are compatible with a liquid crystalline base mixture. In particular the invention provides means for the reduction of the absolute refractive indices and/or the reduction of the birefringence of a liquid crystalline host mixture. It is well known that the performance of known optical and electro-optic devices can be improved by the reduction of the refractive indices or birefringence of the liquid crystalline material contained therein. For example, in the electro-optic display based upon the twisted nematic mode of operation, the off-state transmission of light only achieves its ideal value for discreet values of the parameter U where U is defined by the relation $$U=2D\Delta n/\lambda$$

where D is the thickness of the display cell, $\Delta n$ is the birefringence of the liquid crystal and $\lambda$ is the average wavelength of visible light and optimal performance in the display cell is obtained for values of U equal to $\sqrt{3}$, $\sqrt{15}$, etc. To allow use of a liquid crystalline material in a display cell it is therefore desirable that its birefringence should be adjusted so that the above equation is satisfied for the particular cell thickness which is chosen. In liquid crystal display cells containing dichroic dyed liquid crystal materials and operating in the cholesteric to nematic phase-change mode otherwise known as the White Taylor mode of operation, the birefringence of the liquid crystalline host mixture leads to the undesirable propagation of eliptically polarised light rays in the display cell- which- diminishes the optical efficiency of the display devices. It is therefore desirable when designing liquid crystal materials for use in this type of display, to adjust the birefringence of the liquid crystalline phase to the smallest practical value in order to obtain the best performance from the display. In electro-optic switching devices in which the liquid crystal material is used as on overlay on a planar optical waveguide, or as a cladding material on a fibre waveguide, it is essential that at least one of the refractive indices of the liquid crystalline material used is lower in value than that of the waveguide material or else the structure will no longer sustain the propagation of light within the waveguide. According to the mode of operation chosen for such a device, it may be required to have the waveguide refractive index intermediate between the two refractive indices of the liquid crystalline overlayer, or to have the refractive index of the waveguide higher than either of the refractive indices of the liquid crystalline material In liquid crystal mixtures intended for use in the NCAP display mode the clarity of the "ON" state of the device depends upon the accurate matching of the ordinary refractive index of the LC material to the refractive index of the supporting polymer matrix. The ability to alter the absolute refractive indices of the liquid crystal therefore both facilitates the formulation of mixtures for use in this device, and offers the opportunity to utilise a wider range of supporting polymers than would otherwise be possible.

For simplicity, in the following text Cy is a 1,4-cyclohexylene group, Dio is a 1,3-dioxane-2,5-diyl group, Bi is a bicyclo-[2,2,2]octylene-1,3-diyl group, Phe is a 1,4-phenylene group, Pym is a pyrimidine-2,5-diyl group and Pyr is a pyridine-2,5-diyl group, it being possible for Cy and/or Phe to be unsubstituted or substituted by one or two F and/or Cl atoms and/or CH₃ groups and/or CN groups.

The additives of the formula I can be used as components of liquid crystalline mixtures, in particular for displays based on the principle of the twisted cell, the guest/host effect the effect of deformation of aligned phases or the effect of dynamic scattering.

The invention was based on the object of discovering new stable partially fluorinated additives which are suitable as components of conventional liquid crystalline mixtures.

Partially fluorinated liquid crystalline compounds containing substantially fluorinated terminal groups are known (D. Demus et al., Flüssige Kristalle in Tabellen II, VEB Deutscher Verlag für Grundstoffindustrie, Leipzig 1984). The fluorinated terminal groups are perfluoralkyl, perfluoralkyloxy, ω-H-perfluoralkyloxy and perfluoralkylthio. Although these liquid crystalline compounds might be expected to show similar beneficial properties for device applications their use is prevented by the absence in the liquid crystalline phase sequence of such compounds, of the nematic, chiral nematic and less ordered smectic A and smectic C phases commonly used in electro-optic switching devices. Furthermore it is known that when such materials are added to host mixtures having these phases the stability of the phases is strongly depressed and/or these materials are essentially insoluble in convential host mixtures.

The compounds of the formula I have a wide range of application. Depending on the choice of the substituents, these compounds can be used as the base materials from which liquid crystalline mixtures are composed up to 50%; however, it is also possible for compounds of the formula I to be added to liquid crystalline base materials of other classes of compounds, in order to influence the optical anisotropy of such a dielectric. In general the reduction in refractive indices is proportional to the amount of the fluorinated additive which is included in the mixture, and the amount used is determined either by the quantity required to achieve a target value of refractive index or by the limited solubility of the additive or by the reduction in the clearing point of the mixture. In practice total additive concentrations of up to 40% are useful. Preferably total additive concentrations are in the range of 3 to 25%. The compounds of the formula I are furthermore suitable as intermediate products for the preparation of other substances which can be used as constituents of liquid crystalline dielectrics.

The compound of the formula I are colourless in the pure state. They are very stable towards chemicals, heat and light.

The essential aspect of the additives of formula I is they contain a hydrocarbon group $R^1$—$(CH_2)_m$— functionally bonded to a fluorocarbon group which in turn carries a hydrogen atom or second hydrocarbon derivative $R^2$ at the other end. The precise nature of the hydrocarbon groups and the functional linkage can be changed widely.

The compounds of formula I do not of themselves necessarily or generally exhibit liquid crystalline phases, but it has unexpectedly been discovered that they may be dissolved in known liquid crystalline host materials in sufficient quantity to allow the refractive indices of the host material to be changed without destroying the liquid crystalline properties of the host material. The additive of structure I may, but need not contain a structural component which is typical of liquid crystalline compounds and the retention of liquid crystalline properties in the final mixture is not predominently influenced by the presence or absence of such a group.

Additives which have a greater degree of fluorine substitution than the compounds of structure I shown very low values of refractive index, but also show insufficient solubility in commonly used liquid crystal host materials to be utilized for the purpose of changing the physical properties of the host. The refractive indices of organic compounds having a smaller degree of fluorine substitution than the compounds of structure I are too high to be usefully applied to the reduction of refractive indices in host systems. Furthermore, such organic compounds which lack the structural units typical of liquid crystalline compounds strongly depress the liquid crystal to isotropic transition temperature of the host.

Compounds of structure I show particularly advantageous properties for the purpose of adjusting the refractive indices of liquid crystal host mixtures. They combine the favourable qualities of a relatively low refractive index, good solubility in common liquid crystal classes, low volatility and a small depression of the liquid crystal-isotropic transition temperature when added to known liquid crystals. Although other compound classes are known which possess some of these favourable qualities, compounds of structure I possess all three in a combination particularly suitable for the formulation of practical mixtures.

The invention thus relates to liquid crystalline mixtures with at least two liquid-crystalline compounds which are free of perfluoro alkylene groups and at least one partially fluorinated additive of formula I

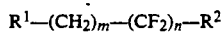

wherein m is 0 to 12, n is 1 to 16 and $R^1$ and $R^2$ each signify a group of formula.

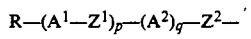

in which
R is F or alkyl with 1–15 C atoms, it also being possible for one or two non-adjacent CH₂ groups to be replaced by —O—, —CO—, —O—CO—, —CO—O—, —O—CO—O—, —C≡C— and/or —CH=CH—, $A^1$ and $A^2$ are in each case an unsubstituted or mono- or polysubstituted 1,4-cyclohexylene group, it also being possible for one or two non-adjacent CH groups to be replaced by —O— and/or —S—, or denote a 1,4-bicyclo[2,2,2]octylene group, or a 1,4-phenylene group which is unsubstituted or substituted by one or two F and/or Cl atoms and/or CH₃ groups and/or CN groups, it also being possible for one or two CH groups to be replaced by N, $Z^1$ denotes —CO—O—, —O—CO—, —CH₂CH₂—, —CHCN—CH₂—, —CH₂—CHCN—, —CH=CH—, —C≡C—, —OCH₂—, —CH₂O—, —CH=N—, —N=CH—, —N=N—, —NO=N—, —N=NO— or a single bond, $Z^2$ denotes —CO—O—, —O—CO—, —CH₂CH₂—, —CHCN—CH₂—, —CH₂—CHCN—, —CH=CH—, —C≡C—, —OCH₂—, —CH₂O—, —CH=N—, —N=CH—, —N=N—, —NO=N—, —N=NO—, —(CH₂)ₖ—CO—O— or a single bond, k is 1 to 6,
p is 0, 1 or 2, and
q is 0 or 1, one of the groups $R^1$ and $R^2$ may also denote H, with the proviso that the sum m+p+q equals 1 to 15.

The invention furthermore relates to compounds of the formula I, wherein $R^1$, $R^2$, R, n, p, 1, K, $A^1$, $A^2$, $Z^1$, and $Z^2$ have the meaning given, and m is 1 to 12.

In addition the invention relates to compounds of the formula II, $$R-(A^1-Z^1)_p-A^1-O-CO-A^2-(CF_2)_n-F \quad II$$

wherein R, $A^1$ $Z^1$ and n have the meaning given, and
$A^2$ is an unsubstituted or monosubstituted or polysubstituted 1,4-cyclohexylene group in which one or two non-adjacent $CH_2$-groups can be replaced by —O— and/or —S—, and
P is 0 or 1

The invention furthermore relates to a means of reducing the refractive indices of a liquid crystalline mixture by adding one or more partially fluorinated additives of formula I. The invention furthermore relates to the use of partially fluorinated additives of formula I as components of liquid crystalline mixtures, and electrooptic display devices containing such mixtures.

Above and below, $R^1$, $R^2$, R, m, n, p, q, k, $A^1$, $A^2$, $Z^1$ and $Z^2$ have the meaning given, unless expressly indicated otherwise.

The compounds of the formula I accordingly include preferred compounds without rings of the part formula Ia:

$$R-Z^2-(CH_2)_m-(CF_2)_n-R \quad Ia$$

compounds with one ring of part formulae Ib and Ic:

$$R-A^2-Z^2-(CH_2)_m-(CF_2)_n-R \quad Ib$$

$$R-Z^2-(CH_2)_m-(CF_2)_n-Z^2-Z^2-R \quad Ic$$

compounds with two rings of the part formulae Id to If:

$$R-A^1-Z^1-A^2-Z^2-(CH_2)_m-(CF_2)_n-R \quad Id$$

$$R-Z^2-(CH_2)_m-(CF_2)_n-Z^2-A^2-Z^1-A^1-R \quad Ie$$

$$R-A^2-Z^2-(CH_2)_m-(CF_2)_n-Z^2-A^2-R \quad If$$

and compounds with three rings of the part formulae Ig and Ih;

$$R-(A^1-Z^1)_2-A^2-Z^2-(CH_2)_m-(CF_2)_n-R \quad Ig$$

$$R-Z^2-(CH_2)_m-(CF_2)_n-Z^2-A^2-(Z^1-A^1)_2-R \quad Ih$$

The compounds of the formula II include preferred compounds with two rings of the part formula IIa, $$R-A^1-O-CO-A^2-(CF_2)_n-F \quad IIa$$

and with three reings of the pat formulae IIb and IIc:

$$R-A^1-A^1-O-CO-A^2-(CF_2)_n-F \quad IIb$$

$$R-A^1-Z^1-A^1-O-CO-A^2-(CF_2)_n-F \quad IIc$$

In the compounds of the formulae above and below R preferably denotes independently F, alkyl, or furthermore alkoxy. One of the groups R in the above formulae may also preferably denote H.

$A^1$ and $A^2$ are preferably Cy, Phe, Dio, Pym, or Pyr; the compounds of the formulae I and II preferably contain not more than one of the radicals Dio, Bi, Pym, or Pyr.

$Z^1$ and $Z^2$ are preferably single bonds, and secondly preferably —CO—O—, —O—CO— or —$CH_2CH_2$- groups. $Z^2$ may also preferably denote —($CH_2$)$_k$—CO—O—, k is preferably 1 or 2. Particularly preferred are compounds wherein $Z^2$ denotes —CO—O—. Particularly preferred are compounds wherein $A^1$ and $A^2$ are Cy.

m is preferably 0 to 5. Particularly preferred is m=1.
n is preferably 2 to 12. Particularly preferred are 4, 6, 8 and 10.

If R is an alkyl radical and/or alkoxy radical, this radical can be straight-chain or branched. Preferably, it is straight-chain and has 2, 3, 4, 5, 6 or 7 C atoms and is accordingly preferably ethyl, propyl, butyl, pentyl, hexyl, heptyl, ethoxy, propoxy, butoxy, pentoxy, hexoxy or heptoxy, also methyl, octyl, nonyl, decyl, undecyl, dodecyl, tridecyl, tetradecyl, pentadecyl, methoxy, octoxy, nonoxy, decoxy, undecoxy, dodecoxy, tridecoxy or tetradecoxy.

Oxaalkyl is preferably straight-chain 2-oxapropyl (=methoxymethyl), 2-(=ethoxymethyl) or 3-oxybutyl (=2-methoxyethyl), 2-, 3- or 4-oxapentyl, 2-, 3-, 4- or 5-oxyhexyl, 2-, 3-, 4-, 5- or 6-oxaheptyl, 2-, 3-, 4-, 5-, 6-, or 7-oxaoctyl, 2-, 3-, 4-, 5-, 6-, 7- or 8-oxanonyl or 2-, 3-, 4-, 5-, 6-, 7-, 8- or 9-oxadecyl.

If R is an alkyl radical in which a $CH_2$ group is replaced by —CH=CH—, it can be straight-chain or branched. Preferably, it is straight-chain and has 2 to 10 C atoms. It is accordingly, in particular, vinyl, prop-1- or prop-2-enyl, but-1-, -2- or -3-enyl, pent-1-, -2-, -3- or -4-enyl, hex-1-, -2-, -3-, -4- or -5- enyl, hept-1-, -2-, -3-, -4-, -5- or -6-enyl, oct-1-, -2-, -3-, -4-, -5-, -6- or -7-enyl, non-1-, -2-, -3-, -4-, -5-, -6-, -7- or -8-enyl or dec-1-, -2-, -3-, -4-, -5-, -6-, -7-, -8- or -9-enyl.

Compounds of the formula I with branched terminal groups R can occasionally be of importance because of an improved solubility in the customary liquid crystal base materials, but in particular as chiral doping substances if they are optically active.

Branched groups of this type as a rule contain not more than one chain branching. Preferred branched radicals R are isopropyl, 2-butyl (=1-methylpropyl), isobutyl (=2-methylpropyl), 2-methylbutyl, isopentyl (=3-methylbutyl), 2-methylpentyl, 3-methylpentyl, 2-ethylhexyl, 2-propylpentyl, isopropoxy, 2-methylpropoxy, 2-methylbutoxy, 3-methylbutoxy, 2-methylpentoxy, 3-methylpentoxy, 2-ethylhexoxy, 1-methylhexoxy and 1-methylheptoxy.

Formulae I and II include both the racemates of these compounds and the optical antipodes, as well as mixtures thereof.

Of the compounds of the formulae I, II, Ia to Ih and IIa to IIc those in which at least one of the radicals contained therein has one of the preferred meanings mentioned are preferred.

Particularly preferred smaller groups of compounds of the formula I are those of the formula I1 to I9:

$$R-COO-(CH_2)_m-(CF_2)_n-H \quad I1$$

$$R-A^2-COO-(CH_2)_m-(CF_2)_n-H \quad I2$$

$$R-A^2-(CH_2)_k-COO-(CH_2)_m-(CF_2)_n-H \quad I3$$

$$R-A^1-A^2-COO-(CH_2)_m-(CF_2)_n-H \quad I4$$

R—A$^1$—A$^2$—(CH$_2$)$_k$—COO—(CH$_2$)$_m$—(CF$_2$)$_n$—H   I5

R—(CH$_2$)$_m$—(CF$_2$)$_n$—R'   I6

R—A$^1$—OCO—A$^2$—(CH$_2$)$_m$—(CF$_2$)$_n$—H   I7

R—A$^1$—OCO—A$^2$—(CH$_2$)$_m$—(CF$_2$)$_n$—F   I8

F—A$^1$—OCO—A$^2$(CH$_2$)$_m$—(CF)$_n$—F   I9

In the preferred compounds of the formula I 6R and R' independently have one of the meanings of R in formula I. Preferably R is alkanoyloxy with up to 15 C atoms and R' denotes preferably alkyl with 2-15 C atoms, wherein one CH$_2$ group is replaced by —O—CO— or —CO—O. A particularly preferred meaning of R' is —(CH$_2$)$_r$—O—CO—(CH$_2$)$_s$—H, wherein r is 1, 2, 3, 4, 5, 6, 7, 8, 9, 10, 11, 12 or 13 and s is 1, 2, 3, 4, 5, 6, 7, 8, 9, 10, 11, 12 or 13. (r+s) is 2 to 14. Particularly preferred smaller groups of compounds of the formula II are those of formula II1 to II7:

R—Phe—OCO—Cy—(CF$_2$)$_n$—F   II1

RO—Phe—OCO—Cy—(CF$_2$)$_n$—F   II2

R—Phe—Phe—O—CO—Cy—(CF$_2$)$_n$—F   II3

R—Cy—Phe—O—CO—Cy—(CF$_2$)$_n$—F   II4

R—Cy—O—CO—Cy—(CF$_2$)$_n$—F   II5

R—Pym—Phe—O—CO—Cy—(CF$_2$)$_n$—F   II6

F—Phe—O—CO—Cy—(CF$_2$)$_n$—F   II7

In the compounds of the formulae I and II, those steroisomers in which the rings Cy are trans-1,4-disubstituted and/or Dio are trans-2,5-distributed are preferred. Those of the abovementioned formulae which contain one or more groups Dio, Pym and/or Pyr include in each case the two 2,5-position isomers.

In the compound of the formulae I and II in which A$^1$ represents a Pym or Pyr ring which is substituted in the 2-position by R, R is preferably alkyl.

The compounds of the formulae I and II are prepared by methods which are known per se, such as are described in the Literature (for example in the standard works, such as Houben-Weyl, Methoden der Organischen Chemie [Methods or Organic Chemistry], Georg-Thieme-Verlag, Stuttgart), and in particular under reaction conditions which are known and suitable for the reactions mentioned. Variants which are known per se and are not mentioned in more detail here can also be used in this connection.

If desired, the starting substances can also be formed in situ, such that they are not isolated from the reaction mixture but are immediately reacted further to give the compounds of the formulae I and II.

Esters of the formulae I and II can be obtained by esterification of corresponding carboxylic acids (or their reactive derivatives) wich alcohols or phenols (or their reactive derivatives).

The corresponding carboxylic acids and alcohols or phenols are known or can be prepared by processes analogous to known processes.

Particularly suitable reactive derivatives of the carboxylic acids mentioned are the acid halides, above all the chlorides and bromides, and furthermore the anhydrides, for example also mixed anhydrides, azides or esters, in particular alkyl esters with 1-4 C atoms in the alkyl group.

Possible reactive derivatives of the alcohols or phenols mentioned are, in particular, the corresponding metal alcoholates or phenolates, preferably of an alkali metal, such as sodium or potassium.

The esterification is advantageously carried out in the presence of an inert solvent. Particularly suitable solvents are ethers, such as diethyl ether, di-n-butyl ether, THF, dioxane or anisole, ketones, such as acetone, butanone or cyclohexanone, amides, such as dimethylformamide or phosphoric acid hexamethyltriamide, hydrocarbons, such as benzene, toluene or xylene, halogenohydrocarbons, such as carbon tetrachloride or tetrachloroethylene, and sulfoxides, such as dimethylsulfoxide or sulfolane. Water-immiscible solvents can simultaneously be advantageously used for azeotropic distillation of the water formed during the esterification. An excess of an organic base, for example pyridine, quinoline or triethylamine, can cation. The esterification can also be carried out in the absence of a solvent, for example by heating the components in the presence of sodium acetate. The reaction temperature is usually between $-50°$ and $+250°$, preferable between $-20°$ and $+80°$. At these temperatures, the esterification reactions have as a rule ended after 15 minutes to 48 hours.

In detail, the reaction conditions for the esterification depend largely on the nature of the starting substances used. Thus, a free carboxylic acid is as a rule reacted with a free alcohol or phenol in the presence of a strong acid, for example a mineral acid, such as hydrochloric acid or sulfuric acid. A preferred reaction procedure is the reaction of an acid anhydride or, in particular, an acid chloride with an alcohol, preferably in a basic medium, bases which are of importance being, in particular, alkali metal hydroxides, such as sodium hydroxide or potassium hydroxide, alkali metal carbonates or bicarbonates, such as sodium carbonate, sodium bicarbonate, potassium carbonate or potassium bicarbonate, alkali metal acetates, such as sodium acetate or potassium acetate, alkaline earth metal hydroxides, such as calcium hydroxide, or organic bases, such as triethylamine, pyridine, lutidine, collidine or quinoline. Another preferred embodiment of the esterification comprises first converting the alcohol or phenol into the sodium alcoholate or phenolate or potassium alcoholate or phenolate, for example by treatment with ethanolic sodium hydroxide solution or potassium hydroxide solution, isolating this product and suspending it in acetone or diethyl ether, together with sodium bicarbonate or potassium carbonate, with stirring, and adding a solution of the acid chloride or anhydride in diethyl ether, acetone or dimethylformamide to this suspension, advantageously at temperatures between about $-25°$ and $+20°$.

This liquid crystalline mixtures according to the invention consist of 3 to 25, preferably 4 to 15, components, at least one of which is a compound of the formula I. the other constituents are preferably chosen from nematic or nematogenic substances which are free of perfluoro alkylene groups, in particular the known substances, from the classes of azoxybenzenes, benzylideneanilines, biphenyls, terphenyls, phenyl or cyclohexyl benzoates, phenyl or cyclohexyl cyclohexanecarboxylates, phenylcyclohexanes, cyclohexylbiphenyls, cyclohexylcyclohexanes, cyclohexylcyclohexenes, cyclohexylnaphthalenes, 1,4-bis-cyclohexylbenzenes, 4,4'-biscyclohexylbiphenyls, phenyl- or cyclohexylprimidines, phenylpyridines, phenyl- or cyclohexyldioxanes, phenyl- or cyclohexyldithianes, 1,2-bis-phenylethanes, 1,2-biscyclohexylethanes, 1-phenyl-2-cyclohexylethanes, optionally halogenated stilbenes, benzyl phenyl ethers, tolanes and substituted cinnamic acids.

The most important compounds which are possible constituents of such liquid crystalline mixtures can be characterized by the formula III

  III wherein L and E are each a unsubstituted or laterally fluoro or cyano substituted carbo- or heterocyclic ring system from the group comprising 1,4-disubstituted benzene and cyclohexane rings, 1,4-disubstituted 1-cyano-cyclohexane rings, 4,4'-disubstituted biphenyl, phenylcyclohexane and cyclohexylcyclohexane systems, 2,5-disubstituted pyrimidine, pyridine and 1,3-dioxane rings, 2,6-disubstituted naphthalene, di- and tetrahydronaphthalene, quinazoline and tetrahyroquinazoline, G is

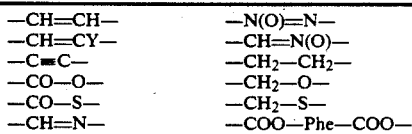

or a C—C single bond, Y is halogen, preferably chlorine, or —CN and $R^3$ and $R^4$ are alkyl, alkoxy, alkanoyloxy or alkoxycarbonyloxy with up to 18, preferably up to 8, carbon atoms, it also being possible for one $CH_2$ group non-adjacent to an oxygen atom to be replaced by —O—, —CH=CH— or —C≡C—, or one of these radicals $R^3$ and $R^4$ may also denote CN, $NO_2$, $CF_3$, NCS, F, Cl or Br.

In most of these compounds, $R^3$ and $R^4$ are different for one another, one of these radicals usually being an alkyl or alkoxy group. However, other variants of the substituents envisaged can also be used. Many such substances or mixtures thereof are commercially available. All of these substances can be prepared by methods which are known from the literature.

The liquid crystalline mixtures according to the invention contain about 0.1 to 50, preferably 10 to 40%, of one or more compounds of the formula I. Liquid crystalline mixtures which contain 0.1-50, in particular 0.5-30%, of one or more compounds of the formula I are furthermore preferred. Isotropic compounds of the formula I can be used advantageously in the phases according to the invention.

The liquid crystalline mixtures according to the invention are prepared in a manner which is customary per se. As a rule, the components are dissolved in one another, advantageously at elevated temperature.

The liquid crystalline mixtures according to the invention can be modified by suitable additives such that they can be used in all the types of liquid crystal display elements disclosed to date.

Such additives are known to the expert and are described in detail in the literature. For example, it is possible to add conductive salts, preferably ethyl-dimethyl-dodecyl-ammonium 4-hexyloxybenzoate, tetrabutylammonium tetraphenylboranate or complex salts of crown ethers (compare, for example, I. Haller et al., Mol.Cryst.Liq. Cryst. Volume 24, pages 249-258 (1973) for improving the conductivity, dichroic dye-stuffs for the production of coloured quest/host systems or substances for changing the dielectric anisotropy, the viscosity and/or the orientation of the nematic phases. Such substances are described, for example, in German Offenlegungsschrift 2,209,127, 2,240,863, 2,321,632, 2,338,281, 2,450,088, 2,637,430, 2,853,728 and 2,902,177.

The following examples are intended to illustrate the invention without limiting it. Percentages above and below are percentages by weight. All the temperatures are given in degrees Centigrade.

EXAMPLE 1

Preparation of 1H,1H,9H-hexadecafluoro-1-nonyl n-hexanoate.

Commercially available 1H,1H,9H-hexadecafluoro-1-nonyl alcohol (10 g) is dissolved in a mixture of dichloromethane (35 mls) and triethylamine (7 mls) in a 100 ml round bottomed flask equipped with a reflux condenser.

A solution of n-hexanoyl chloride (3.1 g) in dichloromethane (15 mls) is added dropwise. The resulting mixture is heated under reflux for 90 minutes and allowed to cool to room temperatures. The reaction mixture is added to a mixture of water (50 mls) and concentrated hydrochloric acid (10 mls) and shaken thoroughly. The organic phase is separated off, washed with water, dried over anhydrous sodium sulphate and the solvent removed by distillation to yield a product as a yellow oil. The crude product is purified by chromatography on basic alumina (25 g) and silica gel (25 g) eluted with dichloromethane followed by vacuum distillation, the fraction boiling point 77°–79°/0.1 torr being collected. The yield of colourless oil is 8.1 g (66%) of glc purity 96%.

The following compounds are obtained analogously:
1H,1H,9H-hexadecafluoro-1-nonyl n-decanoate
1H,1H,9H-hexadecafluoro-1-nonyl n-nonanoate
1H,1H,9H-hexadecafluoro-1-nonyl n-octanoate
1H,1H,9H-hexadecafluoro-1-nonyl n-heptanoate, m.p. −22°, b.p. 84°–100°/0.01 torr
1H,1H,9H-hexadecafluoro-1-nonyl n-pentanoate, m.p. −20°, b.p. 64°–96°/0.01 torr
1H,1H,9H-hexadecafluoro-1-nonyl n-butyrate
1H,1H,9H-hexadecafluoro-1-nonyl n-propionate
1H,1H,11H-eicosafluoro-1-undecyl n-decanoate
1H,1H,11H-eicosafluoro-1-undecyl n-nonanoate
1H,1H,11H-eicosafluoro-1-undecyl n-octanoate
1H,1H,11H-eicosafluoro-1-undecyl n-heptanoate
1H,1H,11H-eicosafluoro-1-undecyl n-hexanoate, m.p. 28°, b.p. 92°–93°/0.1 torr
1H,1H,11H-eicosafluoro-1-undecyl n-pentanoate
1H,1H,11H-eicosafluoro-1-undecyl n-butyrate
1H,1H,11H-eicosafluoro-1-undecyl n-propionate
1H,1H,7H-dodecafluoro-1-heptyl n-decanoate
1H,1H,7H-dodecafluoro-1-heptyl n-nonanoate
1H,1H,7H-dodecafluoro-1-heptyl n-octanoate
1H,1H,7H-dodecafluoro-1-heptyl n-heptanoate
1H,1H,7H-dodecafluoro-1-heptyl n-hexanoate
1H,1H,7H-dodecafluoro-1-heptyl n-pentanoate
1H,1H,7H-dodecafluoro-1-heptyl n-butyrate
1H,1H,7H-dodecafluoro-1-heptyl n-propionate
1H,1H,5H-octafluoro-1-pentyl n-decanoate
1H,1H,5H-octafluoro-1-pentyl n-nonanoate
1H,1H,5H-octafluoro-1-pentyl n-octanoate 1H,1H,5H-octafluoro-1-pentyl n-heptanoate
1H,1H,5H-octafluoro-1-pentyl n-hexanoate
1H,1H,5H-octafluoro-1-pentyl n-pentanoate
1H,1H,5H-octafluoro-1-pentyl n-butyrate
1H,1H,5H-octafluoro-1-pentyl n-propionate

EXAMPLE 2

Preparation of 1H,1H,11H-Eicosafluoro-1-undecyl 4-n-propyl trans-cyclohexyl carboxylate 1H,1H,11H-Eicosafluoro-1-undecyl alcohol (10 g) is esterified with trans-4-n-propylcyclohexyl carbonyl chloride by the same method as example 1. The product is yellow solid (13.1 g). The crude product is purified by chromatography on basic alumina (25 g) and silica gel (25 g) eluted with dichloromethane, followed by recrystallisation from industrial methylated spirits (20 mls). The product is obtained as a white solid, melting point 51.5°, yield 8.0 g (62%), purity by glc 96.4%.

The following compounds are obtained analogously:

1H,1H,11H-eicosafluoro-1-undecyl cyclohexyl carboxylate
1H,1H,11H-eicosafluoro-1-undecyl 4-ethyl trans-cyclohexyl carboxylate
1H,1H,11H-eicosafluoro-1-undecyl 4-butyl trans-cyclohexyl carboxylate
1H,1H,11H-eicosafluoro-1-undecyl 4-pentyl trans-cyclohexyl carboxylate
1H,1H,9H-hexadecafluoro-1-nonyl cyclohexyl carboxylate
1H,1H,9H-hexadecafluoro-1-nonyl 4-ethyl trans-cyclohexyl carboxylate
1H,1H,9H-hexadecafluoro-1-nonyl 4-propyl trans-cyclohexyl carboxylate
1H,1H,9H-hexadecafluoro-1-nonyl 4-butyl trans-cyclohexyl carboxylate
1H,1H,9H-hexadecafluoro-1-nonyl 4-pentyl trans-cyclohexyl carboxylate
1H,1H,7H-dodecafluoro-1-heptyl cyclohexyl carboxylate
1H,1H,7H-dodecafluoro-1-heptyl 4-ethyl trans-cyclohexyl carboxylate
1H,1H,7H-dodecafluoro-1-heptyl 4-propyl trans-cyclohexyl carboxylate
1H,1H,7H-dodecafluoro-1-heptyl 4-butyl trans-cyclohexyl carboxylate
1H,1H,7H-dodecafluoro-1-heptyl 4-pentyl trans-cyclohexyl carboxylate
1H,1H,5H-octafluoro-1-pentyl cyclohexyl carboxylate
1H,1H,5H-octafluoro-1-pentyl 4-ethyl trans-cyclohexyl carboxylate
1H,1H,5H-octafluoro-1-pentyl 4-proyl trans-cyclohexyl carboxylate
1H,1H,5H-octafluoro-1-pentyl 4-butyl trans-cyclohexyl carboxylate
1H,1H,5H-octafluoro-1-pentyl 4-pentyl trans-cyclohexyl carboxylate
1H,1H,11H-eicosafluoro-1-undecyl 2-(4-ethyl-trans-cyclohexyl)acetate
1H,1H,11H-eicosafluoro-1-undecyl 2-(4-propyl-trans-cyclohexyl)acetate, m.p. 44°, b.p. 120°–128°/0.01 torr
1H,1H,11H-eicosafluoro-1-undecyl 2-(4-butyl-trans-cyclohexyl)acetate
1H,1H,11H-eicosafluoro-1-undecyl 2-(4-pentyl-trans-cyclohexyl)acetate
1H,1H,9H-hexadecafluoro-1-nonyl 2-(4-ethyl-trans-cyclohexyl)acetate
1H,1H,9H-hexadecafluoro-1-nonyl 2-(4-propyl-trans-cyclohexyl)acetate
1H,1H,9H-hexadecafluoro-1-nonyl 2-(4-butyl-trans-cyclohexyl)acetate
1H,1H,9H-hexadecafluoro-1-nonyl 2-(4-pentyl-trans-cyclohexyl)acetate
1H,1H,7H-dodecafluoro-1-heptyl 2-(4-ethyl-trans-cyclohexyl)acetate
1H,1H,7H-dodecafluoro-1-heptyl 2-(4-propyl-trans-cyclohexyl)acetate
1H,1H,7H-dodecafluoro-1-heptyl 2-(4-butyl-trans-cyclohexyl)acetate
1H,1H,7H-dodecafluoro-1-heptyl 2-(4-pentyl-trans-cyclohexyl)acetate
1H,1H,11H-eicosafluoro-1-undecyl 3-(4-ethyl-trans-cyclohexyl)propionate
1H,1H,11H-eicosafluoro-1-undecyl 3-(4-propyl-trans-cyclohexyl)priopionate
1H,1H,11H-eicosafluoro-1-undecyl 3-(4-butyl-trans-cyclohexyl)propionate
1H,1H,11H-eicosafluoro-1-undecyl 3-(4-pentyl-trans-cyclohexyl)propionate
1H,1H,9H-hexadecafluoro-1-nonyl 3-(4-ethyl-trans-cyclohexyl)propionate
1H,1H,9H-hexadecafluoro-1-nonyl 3-(4-propyl-trans-cyclohexyl)propionate
1H,1H,9H-hexadecafluoro-1-nonyl 3-(4-butyl-trans-cyclohexyl)propionate
1H,1H,9H-hexadecafluoro-1-nonyl 3-(4-pentyl-trans-cyclohexyl)propionate
1H,1H,7H-dodecafluoro-1-heptyl 3-(4-ethyl-trans-cyclohexyl)propionate
1H,1H,7H-dodecafluoro-1-heptyl 3-(4-propyl-trans-cyclohexyl)propionate
1H,1H,7H-dodecafluoro-1-heptyl 3-(4-butyl-trans-cyclohexyl)propionate
1H,1H,7H-dodecafluoro-1-heptyl 3-(4-pentyl-trans-cyclohexyl)propionate
1H,1H11H-eicosafluoro-1-undecyl 4-(4-ethyl-trans-cyclohexyl)trans-cyclohexyl carboxylate
1H,1H,11H-eicosafluoro-1-undecyl 4-(4-propyl-trans-cyclohexyl)-trans-cyclohexyl carboxylate
1H,1H,11H-eicosafluoro-1-undecyl 4-(4-butyl-trans-cyclohexyl)-trans-cyclohexyl carboxylate
1H,1H,11H-eicosafluoro-1-undecyl 4-(4-pentyl-trans-cyclohexyl)-trans-cyclohexyl carboxylate, m.p. 116°
1H,1H,9H-hexadecafluoro-1-nonyl 4-(4-ethyl-trans-cyclohexyl)trans-cyclohexyl carboxylate
1H,1H,9H-hexadecafluoro-1-nonyl 4-(4-propyl-trans-cyclohexyl)-trans-cyclohexyl carboxylate
1H,1H,9H-hexadecafluoro-1-nonyl 4-(4-butyl-trans-cyclohexyl)-trans-cyclohexyl carboxylate
1H,1H,9H-hexadecafluoro-1-nonyl 4-(4-pentyl-trans-cyclohexyl)-trans-cyclohexyl carboxylate
1H,1H,7H-dodecafluoro-1-heptyl 4-(4-ethyl-trans-cyclohexyl)-trans-cyclohexyl carboxylate
1H,1H,7H-dodecafluoro-1-heptyl 4-(4-propyl-trans-cyclohexyl)-trans-cyclohexyl carboxylate
1H,1H,7H-dodecafluoro-1-heptyl 4-(4-butyl-trans-cyclohexyl)-trans-cyclohexyl carboxylate
1H,1H,7H-dodecafluoro-1-heptyl 4-(4-pentyl-trans-cyclohexyl)-trans-cyclohexyl carboxylate 5
1H,1H,5H-octafluoro-1-pentyl 4-(4-ethyl-trans-cyclohexyl)-trans-cyclohexyl carboxylate
1H,1H,5H-octafluoro-1-pentyl 4-(4-propyl-trans-cyclohexyl)-trans-cyclohexyl carboxylate
1H,1H,5H-octafluoro-1-pentyl 4-(4-butyl-trans-cyclohexyl)-trans-cyclohexyl carboxylate 1H,1H,5H-octafluoro-1-pentyl 4-(4-pentyl-trans-cyclohexyl)-trans-cyclohexyl carboxylate
1H,1H,3H-tetrafluoro-1-propyl 4-(4-ethyl-trans-cyclohexyl)-trans-cyclohexyl carboxylate
1H,1H,3H-tetrafluoro-1-propyl 4-(4-propyl-trans-cyclohexyl)-trans-cyclohexyl carboxylate
1H,1H,3H-tetrafluoro-1-propyl 4-(4-butyl-trans-cyclohexyl)-trans-cyclohexyl carboxylate
1H,1H,3H-tetrafluoro-1-propyl 4-(4-pentyl-trans-cyclohexyl)-trans-cyclohexyl carboxylate
1H,1H,11H-eicosafluoro-1-undecyl p-(4-ethyl-trans-cyclohexyl)benzoate
1H,1H,11H-eicosafluoro-1-undecyl p-(4-propyl-trans-cyclohexyl)benzoate
1H,1H,11H-eicosafluoro-1-undecyl p-(4-butyl-trans-cyclohexyl)benzoate
1H,1H,11H-eicosafluoro-1-undecyl p-(4-pentyl-trans-cyclohexyl)benzoate
1H,1H,9H-hexadecafluoro-1-nonyl p-(4-ethyl-trans-cyclohexyl)benzoate
1H,1H,9H-hexadecafluoro-1-nonyl p-(4-propyl-trans-cyclohexyl)benzoate
1H,1H,9H-hexadecafluoro-1-nonyl p-(4-butyl-trans-cyclohexyl)benzoate
1H,1H,9H-hexadecafluoro-1-nonyl p-(4-pentyl-trans-cyclohexyl)benzoate
1H,1H,7H-dodecafluoro-1-heptyl p-(4-ethyl-trans-cyclohexyl)benzoate
1H,1H,7H-dodecafluoro-1-heptyl p-(4-propyl-trans-cyclohexyl)benzoate
1H,1H,7H-dodecafluoro-1-heptyl p-(4-butyl-trans-cyclohexyl)benzoate
1H,1H,7H-dodecafluoro-1-heptyl p-(4-pentyl-trans-cyclohexyl)benzoate
1H,1H,5H-octafluoro-1-pentyl p-(4-ethyl-trans-cyclohexyl)benzoate
1H,1H,5H-octafluoro-1-pentyl p-(4-propyl-trans-cyclohexyl)benzoate
1H,1H,5H-octafluoro-1-pentyl p-(4-butyl-trans-cyclohexyl)benzoate
1H,1H,5H-octafluoro-1-pentyl p-(4-pentyl-trans-cyclohexyl)benzoate
1H,1H,3H-tetrafluoro-1-propyl p-(4-ethyl-trans-cyclohexyl)benzoate
1H,1H,3H-tetrafluoro-1-propyl p-(4-propyl-trans-cyclohexyl)benzoate
1H,1H,3H-tetrafluoro-1-propyl p-(4-butyl-trans-cyclohexyl)benzoate
1H,1H,3H-tetrafluoro-1-propyl p-(4-pentyl-trans-cyclohexyl)benzoate
1H,1H,11H-eicosafluoro-1-undecyl p-(p-ethylphenyl)benzoate
1H,1H,11H-eicosafluoro-1-undecyl p-(p-propylphenyl)benzoate
1H,1H,11H-eicosafluoro-1-undecyl p-(p-pentylphenyl)benzoate)
1H,1H,11H-eicosafluoro-1-undecyl p-(p-heptylphenyl)benzoate)
1H,1H,11H-eicosafluoro-1-undecyl p-(p-ethoxyphenyl)benzoate)
1H,1H,11H-eicosafluoro-1-undecyl p-(p-butoxyphenyl)benzoate)
1H,1H,11H-eicosafluoro-1-undecyl p-(p-hexoxyphenyl)benzoate)
1H,1H,11H-eicosafluoro-1-undecyl p-(p-octoxyphenyl)benzoate)
1H,1H,9H-hexadecafluoro-1-nonyl p-(p-ethylphenyl)benzoate
1H,1H,9H-hexadecafluoro-1-nonyl p-(p-propylphenyl)benzoate
1H,1H,9H-hexadecafluoro-1-nonyl p-(p-pentylphenyl)benzoate
1H,1H,9H-hexadecafluoro-1-nonyl p-(p-heptylphenyl)benzoate
1H,1H,9H-hexadecafluoro-1-nonyl p-(p-ethoxyphenyl)benzoate
1H,1H,9H-hexadecafluoro-1-nonyl p-(p-butoxyphenyl)benzoate
1H,1H,9H-hexadecafluoro-1-nonyl p-(p-hexoxyphenyl)benzoate
1H,1H,9H-hexadecafluoro-1-nonyl p-(p-octoxyphenyl)benzoate
1H,1H,7H-dodecafluoro-1-heptyl p-(p-ethylphenyl)benzoate
1H,1H,7H-dodecafluoro-1-heptyl p-(p-propylphenyl)benzoate
1H,1H,7H-dodecafluoro-1-heptyl p-(p-pentylphenyl)benzoate
1H,1H,7H-dodecafluoro-1-heptyl p-(p-heptylphenyl)benzoate
1H,1H,7H-dodecafluoro-1-heptyl p-(p-ethoxyphenyl)benzoate
1H,1H,7H-dodecafluoro-1-heptyl p-(p-butoxyphenyl)benzoate
1H,1H,7H-dodecafluoro-1-heptyl p-(p-hexoxyphenyl)benzoate
1H,1H,7H-dodecafluoro-1-heptyl p-(p-octoxyphenyl)benzoate
1H,1H,5H-octafluoro-1-pentyl p-(p-ethylphenyl)benzoate
1H,1H,5H-octafluoro-1-pentyl p-(p-propylphenyl)benzoate
1H,1H,5H-octafluoro-1-pentyl p-(p-pentylphenyl)benzoate
1H,1H,5H-octafluoro-1-pentyl p-(p-heptylphenyl)benzoate
1H,1H,5H-octafluoro-1-pentyl p-(p-ethoxyphenyl)benzoate
1H,1H,5H-octafluoro-1-pentyl p-(p-butoxyphenyl)benzoate
1H,1H,5H-octafluoro-1-pentyl p-(p-hexoxyphenyl)benzoate
1H,1H,5H-octafluoro-1-pentyl p-(p-octoxyphenyl)benzoate
1H,1H,3H-tetrafluoro-1-propyl p-(p-ethylphenyl)benzoate
1H,1H,3H-tetrafluoro-1-propyl p-(p-propylphenyl)benzoate
1H,1H,3H-tetrafluoro-1-propyl p-(p-pentylphenyl)benzoate
1H,1H,3H-tetrafluoro-1-propyl p-(p-heptylphenyl)benzoate
1H,1H,3H-tetrafluoro-1-propyl p-(p-ethoxyphenyl)benzoate
1H,1H,3H-tetrafluoro-1-propyl p-(p-butoxyphenyl)benzoate
1H,1H,3H-tetrafluoro-1-propyl p-(p-hexoxyphenyl)benzoate
1H,1H,3H-tetrafluoro-1-propyl p-(p-octoxyphenyl)benzoate
1H,1H,11H-eicosafluoro-1-undecyl p-(5-ethylpyrimidin-2-yl) benzoate
1H,1H,11H-eicosafluoro-1-undecyl p-(5-propylpyrimidin-2-yl) benzoate
1H,1H,11H-eicosafluoro-1-undecyl p-(5-pentylpyrimidin-2-yl) benzoate 1H,1H,11H-eicosafluoro-1-undecyl p-(5-heptylpyrimidin-2-yl) benzoate
1H,1H,11H-eicosafluoro-1-undecyl p-(5-nonylpyrimidin-2-yl) benzoate
1H,1H,9H-hexadecafluoro-1-nonyl p-(5-ethylpyrimidin-2-yl) benzoate
1H,1H,9H-hexadecafluoro-1-nonyl p-(5-propylpyrimidin-2-yl) benzoate
1H,1H,9H-hexadecafluoro-1-nonyl p-(5-pentylpyrimidin-2-yl) benzoate
1H,1H,9H-hexadecafluoro-1-nonyl p-(5-heptylpyrimidin-2-yl) benzoate
1H,1H,9H-hexadecafluoro-1-nonyl p-(5-nonylpyrimidin-2-yl) benzoate
1H,1H,7H-dodecafluoro-1-heptyl p-(5-ethylpyrimidin-2-yl) benzoate
1H,1H,7H-dodecafluoro-1-heptyl p-(5-propylpyrimidin-2-yl) benzoate
1H,1H,7H-dodecafluoro-1-heptyl p-(5-pentylpyrimidin-2-yl) benzoate
1H,1H,7H-dodecafluoro-1-heptyl p-(5-heptylpyrimidin-2-yl) benzoate
1H,1H,7H-dodecafluoro-1-heptyl p-(5-nonylpyrimidin-2-yl) benzoate
1H,1H,5H-octafluoro-1-pentyl p-(5-ethylpyrimidin-2-yl) benzoate
1H,1H,5H-octafluoro-1-pentyl p-(5-propylpyrimidin-2-yl) benzoate
1H,1H,5H-octafluoro-1-pentyl p-(5-pentylpyrimidin-2-yl) benzoate
1H,1H,5H-octafluoro-1-pentyl p-(5-heptylpyrimidin-2-yl) benzoate
1H,1H,5H-octafluoro-1-pentyl p-(5-nonylpyrimidin-2-yl) benzoate
1H,1H,3H-tetrafluoro-1-propyl p-(5-ethylpyrimidin-2-yl) benzoate
1H,1H,3H-tetrafluoro-1-propyl p-(5-propylpyrimidin-2-yl) benzoate
1H,1H,3H-tetrafluoro-1-propyl p-(5-pentylpyrimidin-2-yl) benzoate
1H,1H,3H-tetrafluoro-1-propyl p-(5-heptylpyrimidin-2-yl) benzoate
1H,1H,3H-tetrafluoro-1-propyl p-(5-nonylpyrimidin-2-yl) benzoate
1H,1H,11H-eicosafluoro-1-undecyl p-(5-ethylpyridin-2-yl) benzoate
1H,1H,11H-eicosafluoro-1-undecyl p-(5-propylpyridin-2-yl) benzoate
1H,1H,11H-eicosafluoro-1-undecyl p-(5-pentylpyridin-2-yl) benzoate
1H,1H,11H-eicosafluoro-1-undecyl p-(5-heptylpyridin-2-yl) benzoate
1H,1H,11H-eicosafluoro-1-undecyl p-(5-nonylpyridin-2-yl) benzoate
1H,1H,9H-hexadecafluoro-1-nonyl p-(5-ethylpyridin-2-yl) benzoate
1H,1H,9H-hexadecafluoro-1-nonyl p-(5-propylpyridin-2-yl) benzoate
1H,1H,9H-hexadecafluoro-1-nonyl p-(5-pentylpyridin-2-yl) benzoate
1H,1H,9H-hexadecafluoro-1-nonyl p-(5-heptylpyridin-2-yl) benzoate
1H,1H,9H-hexadecafluoro-1-nonyl p-(5-nonylpyridin-2-yl) benzoate
1H,1H,7H-dodecafluoro-1-heptyl p-(5-ethylpyridin-2-yl) benzoate
1H,1H,7H-dodecafluoro-1-heptyl p-(5-propylpyridin-2-yl) benzoate
1H,1H,7H-dodecafluoro-1-heptyl p-(5-pentylpyridin-2-yl) benzoate
1H,1H,7H-dodecafluoro-1-heptyl p-(5-heptylpyridin-2-yl) benzoate
1H,1H,7H-dodecafluoro-1-heptyl p-(5-nonylpyridin-2-yl) benzoate
1H,1H,5H-octafluoro-1-pentyl p-(5-ethylpyridin-2-yl) benzoate
1H,1H,5H-octafluoro-1-pentyl p-(5-propylpyridin-2-yl) benzoate
1H,1H,5H-octafluoro-1-pentyl p-(5-pentylpyridin-2-yl) benzoate
1H,1H,5H-octafluoro-1-pentyl p-(5-heptylpyridin-2-yl) benzoate
1H,1H,5H-octafluoro-1-pentyl p-(5-nonylpyridin-2-yl) benzoate
1H,1H,3H-tetrafluoro-1-propyl p-(5-ethylpyridin-2-yl) benzoate
1H,1H,3H-tetrafluoro-1-propyl p-(5-propylpyridin-2-yl) benzoate
1H,1H,3H-tetrafluoro-1-propyl p-(5-pentylpyridin-2-yl) benzoate
1H,1H,3H-tetrafluoro-1-propyl p-(5-heptylpyridin-2-yl) benzoate
1H,1H,3H-tetrafluoro-1-propyl p-(5-nonylpyridin-2-yl) benzoate
1H,1H-trifluoro-1-ethyl-trans,trans-4-ethylbicyclohexylcarboxylate
1H,1H-trifluoro-1-ethyl-trans,trans-4-propylbicyclohexylcarboxylate
1H,1H-trifluoro-1-ethyl-trans,trans-4-butylbicyclohexylcarboxylate
1H,1H-trifluoro-1-ethyl-trans,trans-4-pentylbicyclohexylcarboxylate, m.p. 41° C. c.p. 65° C.
1H,1H-trifluoro-1-ethyl-trans,trans-4-hexylbicyclohexylcarboxylate
1H,1H-trifluoro-1-ethyl-trans,trans-4-heptylbicyclohexylcarboxylate
1H,1H-trifluoro-1-ethyl-trans,trans-4-octylbicyclohexylcarboxylate
1H,1H-trifluoro-1-ethyl 4-(trans-4-ethylcyclohexyl)-benzoate
1H,1H-trifluoro-1-ethyl 4-(trans-4-propylcyclohexyl)-benzoate
1H,1H-trifluoro-1-ethyl 4-(trans-4-butylcyclohexyl)-benzoate
1H,1H-trifluoro-1-ethyl 4-(trans-4-pentylcyclohexyl)-benzoate
1H,1H-trifluoro-1-ethyl 4-(trans-4-hexylcyclohexyl)-benzoate
1H,1H-trifluoro-1-ethyl 4-(trans-4-heptylcyclohexyl)-benzoate
1H,1H-trifluoro-1-ethyl 4-(trans-4-octylcyclohexyl)-benzoate

EXAMPLE 3

Preparation of 1H,1H,5H,5H hexafluoropentyl-1,5-diacetate.

Commercially available 1H,1H,5H,5H hexafluoropentane-1, 5-diol (5 g) was esterified with acetyl chloride (3.7 g) by the method of example 1. The crude product was purified by distillation under vacuum, the fraction boiling point 48°–50° C./0.1 torr was collected to give a yield of 4.2 g (60%) of colourless liquid, purity by glc 98.4%.

EXAMPLE 4

Preparation of 4-fluorophenyl 4-pentadecafluoroheptyl-trans-cyclohexyl carboxylate.

A mixture of 4-pentadecafluoroheptyl-trans-cyclohexane-carboxylic acid (5,0 g) (obtained according to Y. A. Fialkov, et al., Zh. Org. Khim 21, No. 11, pp. 2407–2411 (1985)), thionyl chloride (10 ml), and a few drops of pyridine is boiled for 10 h. The excess of thionyl chloride is destilled off, the residue is dissolved in methylene chloride (10 ml). After filtration the solution is added to a solution of 4-fluorophenol (1,1 g) in pyridine (5 ml) and heated at 40° C. for 2 h. After cooling the reaction mixture is poured into hydrochloric acid (5%) and extracted twice with ether (20 ml each time). The combined organic layers are washed with 15 ml of a saturated solution of ammonium hydrochloride, 5 ml of a aqueous solution of sodium hydroxide (15%) and water. After removing the solvent by destillation and crystallization from heptane 4,6 g of 4-fluorophenyl 4-pentadecafluoroheptyl-trans-cyclohexylcarboxylate are obtained as a solid, melting point 93,6°.

The following compounds are obtained analogously:

4-fluorophenyl 4-trifluoromethyl-trans-cyclohexylcarboxylate
4-fluorophenyl 4-pentafluoroethyl-trans-cyclohexylcarboxylate
4-fluorophenyl 4-heptafluoropropyl-trans-cyclohexylcarboxylate
4-fluorophenyl 4-nonafluorobutyl-trans-cyclohexylcarboxylate
4-fluorophenyl 4-undecafluoropentyl-trans-cyclohexylcarboxylate
4-fluorophenyl 4-tridecafluorohexyl-trans-cyclohexylcarboxylate
4-fluorophenyl 4-heptadecafluorooctyl-trans-cyclohexylcarboxylate
4-propyl-trans-cyclohexyl 4-trifluoromethyl-trans-cyclohexylcarboxylate
4-propyl-trans-cyclohexyl 4-pentafluoroethyl-trans-cyclohexylcarboxylate
4-propyl-trans-cyclohexyl 4-heptafluoropropyl-trans-cyclohexylcarboxylate
4-propyl-trans-cyclohexyl 4-nonafluorobutyl-trans-cyclohexylcarboxylate
4-propyl-trans-cyclohexyl 4-undecafluoropentyl-trans-cyclohexylcarboxylate
4-propyl-trans-cyclohexyl 4-tridecafluorohexyl-trans-cyclohexylcarboxylate
4-propyl-trans-cyclohexyl 4-pentadecafluoroneptyl-trans-cyclohexylcarboxylate K-$S_B$: 105° C. $S_B$-I: 155° C.
4-propyl-trans-cyclohexyl 4-heptadecafluorooctyl-trans-cyclohexylcarboxylate
4-octyloxyphenyl 4-trifluoromethyl-trans-cyclohexylcarboxylate
4-octyloxyphenyl 4-pentafluoroethyl-trans-cyclohexylcarboxylate
4-octyloxyphenyl 4-heptafluoropropyl-trans-cyclohexylcarboxylate
4-octyloxyphenyl- 4-nonafluorobutyl-trans-cyclohexylcarboxylate
4-octyloxyphenyl 4-undecafluoropentyl-trans-cyclohexylcarboxylate
4-octyloxyphenyl 4-tridecafluorohexyl-trans-cyclohexylcarboxylate
4-octyloxyphenyl 4-heptadecafluoroheptyl-trans-cyclohexylcarboxylate K-S: 104° C., S-$S_A$: 120,3° C., $S_A$-I: 145,6° C.
2-fluoro-4-heptylphenyl 4-trifluoromethyl-trans-cyclohexylcarboxylate
2-fluoro-4-heptylphenyl 4-pentafluoroethyl-trans-cyclohexylcarboxylate
2-fluoro-4-heptylphenyl 4-heptafluoropropyl-trans-cyclohexylcarboxylate
2-fluoro-4-heptylphenyl 4-nonafluorobutyl-trans-cyclohexylcarboxylate
2-fluoro-4-heptylphenyl 4-undecafluoropentyl-trans-cyclohexylcarboxylate
2-fluoro-4-heptylphenyl 4-tridecafluorohexyl-trans-cyclohexylcarboxylate
2-fluoro-4-heptylphenyl 4-pentadecafluoroheptyl-trans-cyclohexylcarboxylate K-S: 108° C., S-$S_A$: 114,3° C., $S_A$-I 129,7° C.
2-fluoro-4-heptylphenyl 4-heptadecafluorooctyl-trans-cyclohexylcarboxylate
2-fluoro-4-heptylphenyl 4-nonadecafluorononyl-trans-cyclohexylcarboxylate
2-fluoro-4-propylphenyl 4-trifluoromethyl-trans-cyclohexylcarboxylate
2-fluoro-4-propylphenyl 4-pentafluoroethyl-trans-cyclohexylcarboxylate
2-fluoro-4-propylphenyl 4-heptafluoropropyl-trans-cyclohexylcarboxylate
2-fluoro-4-propylphenyl 4-nonafluorobutyl-trans-cyclohexylcarboxylate
2-fluoro-4-propylphenyl 4-undecafluoropentyl-trans-cyclohexylcarboxylate
2-fluoro-4-propylphenyl 4-tridecafluorohexyl-trans-cyclohexylcarboxylate
2-fluoro-4-propylphenyl 4-pentadecafluoroheptyl-trans-cyclohexylcarboxylate
2-fluoro-4-propylphenyl 4-heptadecafluorooctyl-trans-cyclohexylcarboxylate
2-fluoro-4-propylphenyl 4-nonadecafluorononyl-trans-cyclohexylcarboxylate
2-fluoro-4-pentylphenyl 4-trifluoromethyl-trans-cyclohexylcarboxylate
2-fluoro-4-pentylphenyl 4-pentafluoroethyl-trans-cyclohexylcarboxylate
2-fluoro-4-pentylphenyl 4-heptafluoropropyl-trans-cyclohexylcarboxylate
2-fluoro-4-pentylphenyl 4-nonafluorobutyl-trans-cyclohexylcarboxylate
2-fluoro-4-pentylphenyl 4-undecafluoropentyl-trans-cyclohexylcarboxylate
2-fluoro-4-pentylphenyl 4-tridecafluorohexyl-trans-cyclohexylcarboxylate
2-fluoro-4-pentylpenytl 4-pentadecafluoroheptyl-trans-cyclohexylcarboxylate
2-fluoro-4-pentylphenyl 4-heptadecafluorooctyl-trans-cyclohexylcarboxylate
2-fluoro-4-pentylphenyl 4-nonadecafluorononyl-trans-cyclohexylcarboxylate
4-(4-propyl-trans-cyclohexyl)-phenyl 4-trifluoromethyl-trans-cyclohexylcarboxylate
4-(4-propyl-trans-cyclohexyl)-phenyl 4-pentafluoroethyl-trans-cyclohexylcarboxylate
4-(4-propyl-trans-cyclohexyl)-phenyl 4-heptafluoropropyl-trans-cyclohexylcarboxylate
4-(4-propyl-trans-cyclohexyl)-phenyl 4-nonafluorobutyl-trans-cyclohexylcarboxylate
4-(4-propyl-trans-cyclohexyl)-phenyl 4-undecafluoropentyl-trans-cyclohexylcarboxylate 4-(4-propyl-trans-cyclohexyl)-phenyl 4-tridecafluorohexyl-trans-cyclohexylcarboxylate
4-(4-propyl-trans-cyclohexyl)-phenyl 4-pentadecafluoroheptyl-trans-cyclohexylcarboxylate
4-(4-propyl-trans-cyclohexyl)-phenyl 4-heptadecafluorooctyl-trans-cyclohexylcarboxylate
4-(4-propyl-trans-cyclohexyl)-phenyl 4-nonadecafluorononyl-trans-cyclohexylcarboxylate
4-(5-pentylpyrimidin-2-yl)-phenyl 4-trifluoromethyl-transcyclohexylcarboxylate
4-(5-pentylpyrimidin-2-yl)-phenyl 4-pentafluoroethyl-transcyclohexylcarboxylate
4-(5-pentylpyrimidin-2-yl)-phenyl 4-heptafluoropropyl-trans-cyclohexylcarboxylate
4-(5-pentylpyrimidin-2-yl)-phenyl 4-nonafluorobutyl-trans-cyclohexylcarboxylate
4-(5-pentylpyrimidin-2-yl)-phenyl 4-undecafluoropentyl-trans-cyclohexylcarboxylate
4-(5-pentylpyrimidin-2-yl)-phenyl 4-tridecafluorohexyl-trans-cyclohexylcarboxylate
4-(5-pentylpyrimidin-2-yl)-phenyl 4-pentadecafluoroheptyl-trans-cyclohexylcarboxylate
4-(5-pentylpyrimidin-2-yl)-phenyl 4-heptadecafluorooctyl-trans-cyclohexylcarboxylate
4-(5-pentylpyrimidin-2-yl)-phenyl 4-nonadecafluorononyl-trans-cyclohexylcarboxylate

EXAMPLE 5

The refractive indices of a mixture of
28% trans,trans-4-ethyl cyanobicyclohexane,
19% trans,trans-4-propyl cyanobicyclohexane,
23% trans,trans-4-butyl cyanobicyclohexane and
30% trans,trans-4-heptyl cyanobicyclohexane
(commercially available from E. Merck, Darmstadt under the product code ZLI-1695) are measured using an Abbe refractometer thermostatted at 20° C. and using light of wavelength 589 nanometers. The results are found to be $n_o = 1.4709$; $n_e = 1.5334$.

The mixture is then doped with 10% by weight of 1H,1H, 11H-Eicosafluoro-1-undecyl n-hexanoate and the refractive indices are remeasured. The results obtained are $n_o = 1.4614$; $n_e = 1.5194$. The clearing point of the doped nematic mixture is 61.3° to 63.9° C.

EXAMPLE 6

This example describes the use of the present invention to provide a liquid crystal mixture having an ordinary refractive index equal to that of a fused silica optical waveguide at 20° C. and a wavelength of 636 nm. A mixture is formulated containing the following liquid crystal components and additives:

| | |
|---|---|
| ZLI-1695 | 45% |
| trans-4-pentylcyclohexyl-trans-4-propylcyclohexane carboxylate | 10% |
| trans-4-pentylcyclohexyl-trans-4-pentylcyclohexane carboxylate | 10% |
| trans-4-pentylcyclohexyl-trans-4-heptylcyclohexane carboxylate | 10% |
| trans-4-propylcyclohexyl-trans-4-(trans-4-propyl-cyclohexyl) cyclohexane carboxylate | 3.25% |
| trans-4-pentylcyclohexyl-trans-4-(trans-4-propyl-cyclohexyl) cyclohexane carboxylate | 3.25% |
| trans-4-propylcyclohexyl-trans-4-(trans-4-butyl-cyclohexyl) cyclohexane carboxylate | 3.25% |
| trans-4-pentylcyclohexyl-trans-4-(trans-4-butyl-cyclohexyl) cyclohexane carboxylate | 3.25% |
| 1H,1H,9H-hexadecafluoro-1-nonyl-n-hexanoate | 7% |
| 1H,1H,11H-eicosafluoro-1-undecyl-n-hexanoate | 5% |

In the above composition, all conventional liquid crystalline components are hydrogenated liquid crystalline ester derivatives commercially available from E. Merck, Darmstadt. The physical properties of the mixture are determined as below:

| | |
|---|---|
| N—I | 50.2° C. |
| S—N | < −20° C. |
| K—N | 1° C. |
| Viscosity at 20° C. (cSt) | 32.0 |
| $n_o$ at 589 nm at 20° C. | 1.4576 |
| $n_e$ at 589 nm at 20° C. | 1.5064 |
| $\Delta n$ at 589 nm at 20° C. | 0.0510 |
| $n_o$ at 636 nm at 20° C. | 1.4555 |
| $n_e$ at 636 nm at 20° C. | 1.5041 |
| $\Delta n$ at 636 nm at 20° C. | 0.0514 |

The dielectric anisotropy of this mixture is positive and is conferred by the host material ZLI-1695.

EXAMPLE 7

This example describes the preparation of a liquid crystalline mixture of negative dielectric anisotropy with an ordinary refractive index $n_o$ less than the refractive index of a fused silica optical waveguide when measured at 20° C. and wavelength of 636 nm. A mixture is formulated containing the following liquid crystal components and additives:

In this composition the host mixture is a liquid crystalline mixture of negative dielectric anisotropy containing axially substituted trans-trans bicyclohexyls and is commercially available from E. Merck, Darmstadt (ZLI 2585).

| | |
|---|---|
| r-1-cyano-cis-4-(trans-4-butylcyclohexyl)-1-heptyl-cyclohexane | 34% |
| r-1-cyano-cis-4-(trans-4-pentylcyclohexyl)-1-pentyl-cyclohexane | 29% |
| 4′-methoxy-4-propyl trans,trans-cyclohexyl-cyclohexane | 11% |
| 4′-ethoxy-4-propyl trans,trans-cyclohexyl-cyclohexane | 10% |
| trans-4-propylcyclohexyl trans-4-(trans-4-propylcyclohexyl)-cyclohexane carboxylate | 4% |
| trans-4-pentylcyclohexyl trans-4-(-trans-4-propylcyclohexyl)-cyclohexane carboxylate | 4% |
| trans-4-propylcyclohexyl trans-4-(trans-4-butylcyclohexyl)-cyclohexane carboxylate | 4% |
| trans-4-pentylcyclohexyl trans-4-(trans-4-butylcyclohexyl)-cyclohexane carboxylate | 4% |

A mixture is formulated containing the following liquid crystall compounds and additives

| | |
|---|---|
| ZLI 2585 | 79% |
| 1H,1H,9H-hexadecafluoro-1-nonyl-n-hexanoate | 9% |
| 1H,1H,11H-eicosafluoro-1-undecyl-n-hexanoate | 6% |
| 1H,1H,11H-eicosafluoro-1-undecyl-trans-4-n-propyl cyclohexane carboxylate | 6% |

The physical properties of the doped mixture are determined as below:

| | |
|---|---|
| N—I | 47.6° C. |
| S—N | < −20° C. |
| K—N | 9° C. |
| Viscosity at 20° C. | 44.8 cSt |
| $n_o$ at 589 nm at 20° C. | 1.4551 |
| $n_e$ at 589 nm at 20° C. | 1.4893 |
| $\Delta n$ at 589 nm at 20° C. | 0.0342 |
| $n_o$ at 636 nm at 20° C. | 1.4531 |

| | |
|---|---|
| $n_e$ at 636 nm at 20° C. | 1.4874 |
| $\Delta n$ at 636 nm at 20° C. | 0.0343 |

EXAMPLE 8

This example describes the preparation of two liquid crystilline mixtures which are formulated containing the following liquid crystal components in different amounts:

| | Mixture A | Mixture B |
|---|---|---|
| ZLI-1695 | 51% | 55% |
| trans-4-pentylcyclohexyl trans-4-propylcyclohexylcarboxylate | 10.0% | 3.0% |
| trans-4-pentylcyclohexyl trans-4-pentylcyclohexylcarboxylate | 3.0% | 3.0% |
| trans-4-pentylcyclohexyl trans-4-heptylcyclohexylcarboxylate | 7.0% | 7.0% |
| trans-4-propylcyclohexyl trans,trans-4'-propylbicyclohexyl-4-yl-carboxylate trans-4-pentylcyclohexyl | 2.6% | 2.5% |
| trans,trans-4'-propylbicyclohexyl-4-yl-carboxylate trans-4-propylcyclohexyl | 2.2% | 2.0% |
| trans,trans-4'-butylbicyclohexyl-4-yl-carboxylate trans-4-pentylcyclohexyl | 2.8% | 2.6% |
| trans,trans-4'-propylbicyclohexyl-4-yl-carboxylate | 8.4% | 7.9% |
| 1H,1H-9H-hexadecafluoro-1-nonyl-n-hexanoate | 4.0% | 6.0% |
| 1H,1H-9H-hexadecafluoro-1-nonyl-n-heptanoate | 5.0% | 6.0% |
| 1H,1H-11H-eicosafluoro-1-undecyl(trans-4-n-propylcyclohexyl)-acetate | 4.0% | 5.0% |

The physical properties of the doped mixtures are determined as below:

| | Mixture A | Mixture B |
|---|---|---|
| N—I | 61.5° C. | 59.1° C. |
| S—N | <−20° C. | <−20° C. |
| K—N | −7° C. | 4° C. |
| Viscosity at 20° C. | 36.1 cSt | 40.0 cSt |
| $n_o$ at 589 nm at 20° C. | 1.4588 | 1.4565 |
| $n_e$ at 589 nm at 20° C. | 1.5091 | 1.5067 |
| $\Delta n$ at 589 nm at 20° C. | 0.0503 | 0.0502 |
| $n_o$ at 636 nm at 20° C. | 1.4570 | 1.4547 |
| $n_e$ at 636 nm at 20° C. | 1.5073 | 1.5048 |
| $\Delta n$ at 636 nm at 20° C. | 0.0503 | 0,0501 |

EXAMPLE 9

A mixture is formulated containing the following liquid crystal components and additives:

| | |
|---|---|
| ZLI 1695 | 50% |
| trans-4-propyloxycyclohexyl trans,trans-4'-propylbicyclohexyl-4-yl-carboxylate trans-4-pentylcyclohexyl | 15% |
| trans,trans-4'-propylbicyclohexyl-4-yl-carboxylate trans-4-pentylcyclohexyl | 5% |
| trans,trans-4'-butylbicyclohexyl-4-yl-carboxylate | 10% |
| 1H,1H-9H-hexadecafluoro-1-nonyl-n-hexanoate | 7.1% |
| 1H,1H-10H-octadecafluoro-1-decyl-n-heptanoate | 8.4% |
| 1H,1H-11H-eicosafluoro-1-undecyl(trans-4-n-propylcyclohexyl)-acetate | 4.0% |

The physical properties of the doped mixture are determined as below:

| | |
|---|---|
| N—I | 55° C. |
| $n_o$ at 589 nm at 20° C. | 1.4566 |
| $n_e$ at 589 nm at 20° C. | 1.5053 |
| $\Delta n$ at 589 nm at 20° C. | 0,0487 |
| $n_o$ at 633 nm at 20° C. | 1.4505 |
| $n_e$ at 633 nm at 20° C. | 1.5037 |
| $\Delta n$ at 633 nm at 20° C. | 0.0496 |

EXAMPLE 10

A mixture is formulated containing the following liquid crystal compounds and additives:

| | |
|---|---|
| ZLI 1695 | 45% |
| trans,trans-4-propyl-4'-propyloxybicyclohexan | 30% |
| trans-4-pentylcyclohexyl trans-4-propylcyclohexyl carboxylate | 3.33% |
| trans-4-pentylcyclohexyl trans-4-butylcyclohexyl carboxylate | 6.66% |
| 1H,1H,9H-hexadecafluoro-1-nonyl n-hexanoate | 5% |
| 1H,1H,11H-eicosafluoro-1-undecyl n-hexanoate | 5% |
| 1H,1H,11H-eicosafluoro-1-undecyl trans-4-n-propyl-cyclohexyl carboxylate | 5% |

The physical properties of the doped mixture are determined as below

| | |
|---|---|
| N—I | 52.4°-59.9° C. |
| K—N | 9.9° C. |
| dielectric constant (parallel) | 6.53 |
| dielectric constant (perpendicular) | 3.86 |
| anisotropy of the dielectric constant | 2.67 |
| Viscosity at 20° C. | 25.5 c St |

TABLE I

Refractive indices at 20° C. Measured at/nm

| Refractive indices | 436 | 509 | 577 | 589 | 636 | 644 |
|---|---|---|---|---|---|---|
| $n_o$ | 1.4660 | 1.4601 | 1.4580 | 1.4570 | 1.4556 | 1.4545 |
| $n_e$ | 1.5175 | 1.5098 | 1.5067 | 1.5057 | 1.5039 | 1.5028 |
| $\Delta n$ | 0.0515 | 0.0497 | 0.0487 | 0.0480 | 0.0483 | 0.0483 |

EXAMPLE 11

Two mixtures are formulated containing the following liquid crystal compounds and additives in different amounts:

| | Mixture C | Mixture D |
|---|---|---|
| ZLI 1695 | 45% | 45% |
| trans-4-pentylcyclohexyl trans-4-propylcyclohexylcarboxylate | 10% | 10% |
| trans-4-pentylcyclohexyl trans-4-pentylcyclohexylcarboxylate | 10% | 10% |
| trans-4-pentylcyclohexyl trans-4-heptylcyclohexylcarboxylate | 10% | 10% |
| trans-4-propylcyclohexyl trans,trans-4-propylbicyclohexylcarboxylate | 3.25% | 2.5% |
| trans-4-pentylcyclohexyl trans, trans-4-propylbicyclohexylcarboxylate | 3.25% | 2.5% |
| trans-4-propylcyclohexyl trans, trans-4-butylbicyclohexylcarboxylate | 3.25% | 2.5% |
| trans-4-pentylcyclohexyl trans, trans-4-butylbicyclohexylcarboxylate | 3.25% | 2.5% |
| 1H,1H,9H-hexadecafluoro-1-nonyl hexanoate | 7.0% | 5.0% |
| 1H,1H,11H-eicosafluoro-1-undecyl hexanoate | 5.0% | 5.0% |

-continued

|  | Mixture C | Mixture D |
| --- | --- | --- |
| 1H,1H,11H-eicosafluoro-1-undecyl trans-4-propyl-cyclohexylcarboxylate | 0% | 5.0% |

The physical properties of the doped mixtures are determined as below:

|  | Mixture C | Mixture D |
| --- | --- | --- |
| N—I | 56.2° C. | 53.5° C. |
| S—N | <−20° C. | <−20° C. |
| K—N | 1° C. | 10° C. |
| Viscosity at 20° C. | 32.0 cST | 32.1 cST |
| $n_o$ at 589 nm at 20° C. | 1.4576 | 1.4554 |
| $n_e$ at 589 nm at 20° C. | 1.5064 | 1.5034 |
| $\Delta n$ at 589 nm at 20° C. | 0.0508 | 0.0480 |
| $n_o$ at 636 nm at 20° C. | 1.4555 | 1.4534 |
| $n_e$ at 636 nm at 20° C. | 1.5041 | 1.5012 |
| $\Delta n$ at 636 nm at 20° C. | 0.0514 | 0.0482 |

EXAMPLE 12

Two mixtures are formulated containing the following liquid crystal compounds and additives in different amounts:

|  | Mixture E | Mixture F |
| --- | --- | --- |
| ZLI 2585 | 79% | 75% |
| trans-4-propylcyclohexyl trans, trans-4'-propylbicyclohexyl-4-yl-carboxylate | 0.8% | 0.8% |
| trans-4-pentylcyclohexyl trans, trans-4'-propylbicyclohexyl-4-yl-carboxylate | 0.7% | 0.7% |
| trans-4-propylcyclohexyl trans, trans-4'-butylbicyclohexyl-4-yl-carboxylate | 0.9% | 0.9% |
| trans-4-pentylcyclohexyl trans, trans-4'-butylbicyclohexyl-4-yl-carboxylate | 2.6% | 2.6% |
| 1H,1H,9H-hexadecafluoro-1-nonyl heptanoate | 9.0% | 8.0% |
| 1H,1H,9H-hexadecafluoro-1-nonyl hexanoate | 0% | 1.0% |
| 1H,1H,11H-eicosafluoro-1-undecyl hexanoate | 7.0% | 5.0% |

The physical properties of the doped mixtures are determined as below:

|  | Mixture E | Mixture F |
| --- | --- | --- |
| N—I | 57.8° C. | 41.9° C. |
| S—N | <−20° C. | <−20° C. |
| K—N | 0° C. | 4° C. |
| Viscosity at 20° C. | 45.7 cSt | 46.4 cSt |
| $n_o$ at 589 nm at 20° C. | 1.4585 | 1.4565 |
| $n_e$ at 589 nm at 20° C. | 1.4947 | 1.4918 |
| $\Delta_n$ at 589 nm at 20° C. | 0.0362 | 0.0353 |
| $n_o$ at 636 nm at 20° C. | 1.4566 | 1.4547 |
| $n_e$ at 636 nm at 20° C. | 1.4928 | 1.4900 |
| $\Delta n$ at 636 nm at 20° C. | 0.0362 | 0.0353 |

EXAMPLE 13

A mixture is formulated containing the following liquid crystal components and additives:

| ZLI 2585 | 74,8% |
| --- | --- |
| trans-4-pentylcyclohexyl trans,trans-propyl-4'-bicyclohexyl-4-yl-carboxylate | 1.9% |
| trans-4-pentylcyclohexyl trans,trans-propyl-4'-bicyclohexyl-4-yl-carboxylate | 3.3% |
| 1H,1H,9H-hexadecafluoro-1-nonyl heptanoate | 8.0% |
| 1H,1H,9H-hexadecafluoro-1-nonyl hexanoate | 7.0% |
| 1H,1H,11H-eicosafluoro-1-undecyl trans-4-propyl-cyclohexylcarboxylate | 5.0% |

The physical properties of the doped mixture are determined as below:

| N—I | 51.9° C. |
| --- | --- |
| K—N | 4° C. |
| dielectric constant (parallel) | 3.75 |
| dielectric constant (perpendicular) | 7.05 |
| anisotropy of the dielectric constant | −3,30 |
| Viscosity at 20° C. | 43.1 cSt |

TABLE II

| Refractive indices | Refractive indices at 20° C. Measured at /nm | | | | | |
| --- | --- | --- | --- | --- | --- | --- |
|  | 436 | 509 | 577 | 589 | 636 | 644 |
| $n_o$ | 1.4649 | 1.4598 | 1.4567 | 1.4560 | 1.4542 | 1.4536 |
| $n_e$ | 1.5032 | 1.4963 | 1.4926 | 1.4921 | 1.4902 | 1.4899 |
| $\Delta n$ | 0.0383 | 0.0365 | 0.0359 | 0.0361 | 0.0360 | 0.0363 |

EXAMPLE 14

Two mixtures are formulated containing the following liquid crystal components and additives in different amounts:

|  | Mixture G | Mixture H |
| --- | --- | --- |
| ZLI 2585 | 83% | 79% |
| 1H,1H,9H-hexadecafluoro-1-nonyl hexanoate | 10% | 9% |
| 1H,1H,11H-eicosafluoro-1-undecyl hexanoate | 7% | 6% |
| 1H,1H,11H-eicosafluoro-1-undecyl trans-4-propyl-cyclohexylcarboxylate | 0% | 6% |

The physical properties of the doped mixtures are determined as below:

|  | Mixture G | Mixture H |
| --- | --- | --- |
| N—I | 51.1° C. | 47.6° C. |
| S—N | <−20° C. | <−20° C. |
| K—N | 0° C. | 9° C. |
| Viscosity at 20° C. | 44.7 cSt | 44.8 cSt |
| $n_o$ at 589 nm at 20° C. | 1.4577 | 1.4551 |
| $n_e$ at 589 nm at 20° C. | 1.4918 | 1.4893 |
| $\Delta n$ at 589 nm at 20° C. | 0.0341 | 0.0342 |
| $n_o$ at 636 nm at 20° C. | 1.4558 | 1.4531 |
| $n_e$ at 636 nm at 20° C. | 1.4896 | 1.4874 |
| $\Delta n$ at 636 nm at 20° C. | 0.0338 | 0.0343 |

EXAMPLE 15

The refractive indices at 589 nm at 20° C. of a mixture of
24% 4-(trans-4-propylcyclohexyl)-benzonitrile
36% 4-(trans-4-pentylcyclohexyl)-benzonitrile
25% 4-(trans-4-heptylcyclohexyl)-benzonitrile
15% 4-cyano-4'-(trans-4-pentylcyclohexyl)-biphenyl
(commercially available from E. Merck, Darmstadt under the product code ZLI-1132) are determined to be $n_o = 1.4929$; $n_e = 1.6334$; $\Delta n = 0.1405$.

Two mixtures are formulated containing the following liquid crystal compounds:

|  | Mixture I | Mixture J |
| --- | --- | --- |
| ZLI-1132 | 95% | 92.5% |
| 2-fluoro-4-heptylphenyl 4-pentadecafluoroheptyl-trans-cyclohexylcarboxylate | 5% | 7.5% |
| N—I | 70.5° C. | 70.3° C. |
| $n_o$ at 589 nm at 20° C. | 1.4892 | 1.4875 |
| $n_e$ at 589 nm at 20° C. | 1.6265 | 1.6235 |
| $\Delta n$ at 589 nm at 20° C. | 0.137 | 0.136 |

EXAMPLE 16

To a mixture having the composition of Mixture D (compare example 11) are given different amounts of 2-fluoro-4-heptylphenyl trans-4-pentadecafluoroheptyl-cyclohexylcarboxylate (a compound of the formula III). The physical properties of these doped mixtures are listed in Table III.

TABLE III

| Mixture D | Compound III | N—I | Refractive indices at 589 nm | | |
| --- | --- | --- | --- | --- | --- |
| | | | $n_o$ | $n_e$ | $\Delta n$ |
| 100% | 0% | 53.5° C. | 1.4554 | 1.5034 | 0.0480 |
| 97.4% | 2.5% | 54.9° C. | — | — | — |
| 95.0% | 5.0% | 55.7° C. | 1.4534 | 1.5031 | 0.0496 |
| 92.5% | 7.5% | 56.0 | — | — | — |
| 90.0% | 10.0% | 56.6 | 1.4509 | 1.5011 | 0.0501 |

EXAMPLE 17

A mixture is formulated containing the following liquid crystal compounds:

| | |
| --- | --- |
| trans-4-(2-(trans-4-ethyloxycarbonyloxycyclohexyl)-ethyl)-propylcyclohexane | 34% |
| 1H,1H-trifluoro-1-ethyl trans,trans-4'-pentyl-bicyclohexyl-4-yl-carboxylate | 34% |
| 4-(trans-2-tridecafluorohexylcyclohexyl)-trans-propylcyclohexane | 15% |
| 4-(trans-4-methoxycyclohexyl)-trans-propylcyclohexane | 15% |

The physical properties of one liquid crystalline mixture are determined as below:

| | |
| --- | --- |
| N—I | 25° C. |
| S—N | 18° C. |
| K—I | 15.5° C. |
| $n_o$ at 20° C. | 1.4485 |
| $n_e$ at 20° C. | 1.4806 |
| $\Delta n$ at 20° C. | 0.0321 |

EXAMPLE 18

The liquid crystal formulation of example 5 is placed into a cell constructed of two parallel sheets of glass carrying conductive layers of indium tin oxide on their inner surfaces. The inner surfaces are further coated with a thin layer of polyvinyl alcohol deposited by dipping the glass sheets into a 0.1% aqueous solution of the polymer, followed by drying in a current of warm air. The polymer coated surfaces are then unidirectionally rubbed with a cellulose tissue to obtain a preferred alignment direction on each glass surface and the cell assembled with the rubbing directions mutually perpendicular. The glass sheets are spaced 9.5 μm apart by means of polyester spacers. In this configuration the parameter U defined above for the cell is equal to 1.74 for visible light of average wavelength 556 nm, compared to an ideal figure of 1.73. The electro-optic switching characteristics of the display when mounted between polarising films oriented parallel to the rubbing direction on each plate are measured as below:

| | |
| --- | --- |
| $V_{90,0,20}$ | 1.96 volts |
| $V_{10,0,20}$ | 2.91 volts |
| $V_{50,10,20}$ | 2.16 volts |
| $V_{90,45,20}$ | 1.78 volts |
| $M_{20}$ | 1.63 |
| $M'_{20}$ | 1.21 |

The significance of the voltages above is described by the three subscripts appended to each voltage, in which the first subscript describes the percentage transmission of light through the electro-optic cell when viewed between crossed polarising film, the second subscript gives the angle in degrees away from normal incidence in the quadrant of the cell having the lowest threshold voltage at which the measurement is made, and the third subscript gives the temperature in degrees Centigrade at which the measurement is made. The figures $M_{20}$ and $M'_{20}$ defined as below are figures of merit relating to the variation of contrast in the cell under different conditions of angular view. By virtue of the near ideal match of the optical thickness of the cell to the ideal value a good viewing angle characteristic can be obtained.

$$M_{20}V_{10,0,20}/V_{90,45,20}$$

$$M'_{20}V_{50,10,20}/V_{90,45,20}$$

EXAMPLE 19

To a mixture having the composition of Example 10 is given 1.9% of trans-4-propylcyclohexyl trans-4-pentadeca fluoroheptyl-cyclohexylcarboxylate.

The physical properties of the doped mixture are listed below

| | |
| --- | --- |
| N—I | 52.0° C. |
| N—S | < −20° C. |
| K—N | 10.8° C. |
| Viscosity at 20° C. | 26.4 cSt |

TABLE IV

| Refractive indices | Refractive indices at 20° C. Measured at /nm | | | | | |
| --- | --- | --- | --- | --- | --- | --- |
| | 436 | 509 | 507 | 589 | 636 | 644 |
| $n_o$ | 1.4651 | 1.4592 | 1.4554 | 1.4551 | 1.4537 | 1.4512 |
| $n_e$ | 1.5124 | 1.5076 | 1.5033 | 1.5045 | 1.5017 | 1.5006 |
| $\Delta n$ | 0.0472 | 0.0484 | 0.0489 | 0.0494 | 0.0480 | 0.0494 |

We claim:

1. A liquid crystalline mixture comprising at least two liquid-crystalline compounds which are free of perfluoroalkylene groups and not more than 40% by weight of at least one partially fluorinated additive of formula I $$R^1-(CH_2)_m-(CF_2)_n-R^2 \qquad \text{I}$$

wherein m is 0 to 12, n is 2 to 12 and $R^1$ and $R^2$ each signify a group of formula $R-(A^1-Z^1)_p-(A^2)_q-Z^2$ in which
R is F or straight chain alkyl with 1-15 C atoms, it also being possible for one or two non-adjacent $CH_2$ groups to be replaced by —O—, —CO—, —O—CO—, —CO—O, —O—CO—O—, —C≡C— and/or —CH=CH—, $A^1$ and $A^2$ are in each case (1) an unsubstituted or mono- or polysubstituted 1,4-cyclohexylene group, it also being possible for one or two non-adjacent $CH_2$ groups to be replaced by —O— and/or —S—, (2) a 1,4-bicyclo[2,2,2]octylene group, or (3) a 1,4-phenylene group which is unsubstituted or substituted by one or two F and/or Cl atoms and/or $CH_3$ groups and/or CN groups, it also being possible for one or two CH groups to be replaced by N, $Z^1$ is —CO—O—, —O—CO—, —$CH_2CH_2$—, —CHCN—$CH_2$—, —$CH_2$—CHCN—, —CH=CH—, —C≡C—, —$OCH_2$—, —$CH_2O$—, —CH=N—, —N=CH—, —N=N—, —NO=N—, N=NO— or a single bond, is —CO—O—, —O—CO—, —$CH_2CH_2$—, —CHCN—$CH_2$—, —$CH_2$—CHCN—, —CH=CH, —C≡C—, —$OCH_2$—, —$CH_2O$—, —CH=N—, —N=CH=, —N=N—, —NO=N—, —N=NO—, —$(CH_2)_k$—CO—O— or a single bond, k is 1 to 6,
p is 0, 1 or 2, and
q is 0 or 1, or one of the groups $R^1$ and $R^2$ may also be H, with the proviso that the sum of m+p+q equals 1 to 15.

2. A liquid crystalline mixture according to claim 1, wherein in the additive of formula I
$R^2$ is F, and
$R^1$ is a group of the formula $R-(A^1-Z^1)_p-A^2-Z^2-$ in which
R, $A^1$, $A^2$, $Z^1$, $Z^2$ and p have the meaning given.

3. A liquid crystalline mixture according to claim 1, wherein in the additive of formula I n is 3 to 12.

4. An electro-optic display device containing a liquid crystalline mixture according to claim 1.

5. An optical waveguide switching device containing a liquid crystalline mixture according to claim 1.

6. A liquid crystalline mixture according to claim 1, wherein the additive is a compound of the Formula I1

$R-COO-(CH_2)_m-(CF_2)_n-H$  I1 wherein R and n have the meaning given in claim 1, and m is 1 to 12.

7. A liquid crystalline mixture according to claim 1, wherein the additive is a compound of the formula Id $R-A^1-Z^1-A^2-Z^2-(CH_2)_m-(CF_2)_n-R$  Id wherein R, $A^1$, $A^2$, $Z^1$, $Z^2$, and n have the meaning given in claim 1 and m is 1 to 12.

8. A liquid crystalline mixture according to claim 1, wherein the additive is a compound of the Formula Ie $R-Z^2-(CH_2)_m-(CF_2)_n-Z^2-A^2-Z^1-A^1-R$  Ie wherein R, $A^1$, $A^2$, $Z^1$, $Z^2$, and n have the meaning given and m is 1 to 12.

9. A liquid crystalline mixture according to claim 1, wherein the additive is a compound of the formula Ig $R-(A^1-Z^1)_2-A^2-Z^2-(CH_2)_m-(CF_2)_n-R$  Ig wherein R, $A^1$, $A^2$, $Z^1$, $Z^2$, and n have the meaning given in claim 1 and m is 1 to 12.

10. A liquid crystalline mixture according to claim 1, wherein the additive is a compound of the Formula Ih $R-Z^2-(CH_2)_m-(CF_2)_n-Z^2-A^2-(Z^1-A^1)_2-R$  Ih wherein R, $A^1$, $A^2$, $Z^1$, $Z^2$, and n have the meaning given and m is 1 to 12.

11. A liquid crystalline mixture according to claim 1, wherein the additive is a compound of the Formula II $R-(A^1-Z^1)_p-A^1-O-CO-A^2-(CF_2)_n-F$  II wherein R, $A^1$, $Z^1$, and n have the meaning given in claim 1, and
$A^2$ is an unsubstituted, monosubstituted or polysubstituted 1,4-cyclohexylene group in which one or two non-adjacent $CH_2$-groups can be replaced by —O— and/or —S—, and
P is 0 or 1.

12. A liquid crystalline mixture according to claim 1, wherein the additive is a compound of the formula

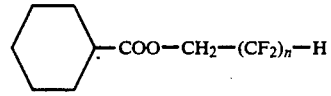

wherein n is 4, 6, 8, or 10.

13. A liquid crystalline mixture according to claim 1, wherein in the additive $Z^2$ is —CO—O—, —$CH_2CH_2$—, —CHCN—$CH_2$—, —$CH_2$—CHCN—, —CH=CH—, —C≡C—, —$OCH_2$—, —$CH_2O$—, —CH=N—, —N=CH—, —N=N, —NO=N, —N=NO—, or a single bond.

14. A liquid crystalline mixture according to claim 1, wherein in the additive $Z^2$ is —$CH_2CH_2$—, —CHCN—$CH_2$—, —$CH_2$—CHCN—, —CH=CH—, —C≡C—, —$OCH_2$—, —$CH_2O$—, —CH=N—, —N=CH—, —N=N, —NO=N, —N=NO—, or a single bond.

15. A liquid crystalline mixture comprising a base material and a 3-25% by weight of an additive, wherein said mixture is nematic, and the additive is of Formula I, $R^1-(CH_2)_m-(CF_2)_n-R^2$  I wherein m is 0 to 12, n is 2 to 12 and $R^1$ and $R^2$ each signify a group of formula $R-(A^1-Z^1)_p-(A^2)_q-Z^2$ in which
R is F or straight-chain alkyl with 1-15 C atoms, it also being possible for one or two non-adjacent $CH_2$ groups to be replaced by —O—, —CO—, —O—CO—, —CO—O, —O—CO—O, —C≡C— and/or —CH=CH—, $A^1$ and $A^2$ are in each case (1) an unsubstituted or mono- or polysubstituted 1,4-cyclohexylene group, it also being possible for one or two non-adjacent $CH_2$ groups to be replaced by —O— and/or —S—, (2) a 1,4-bicyclo[2,2,2]octylene group, or (3) a 1,4-phenylene group which is unsubstituted or substituted by one or two F and/or Cl atoms and/or CH$_3$ groups and/or CN groups, it also being possible for one or two CH groups to be replaced by N, Z$^1$ —CO—O—, —O—CO—, —CH$_2$CH$_2$—, —CH-CN—CH$_2$—, —CH$_2$—CHCH—, —CH=CH—, —C≡C—, —OCH$_2$—, —CH$_2$O—, —CH=N—, —N=CH—, —N=N—, —NO=N—, N=NO— or a single bond, Z$^2$ is —CO—O—, —O—CO—, —CH$_2$CH$_2$—, —CH-CN—CH$_2$—, CH$_2$—CHCH—, —CH=CH—, —C≡C—, —OCH$_2$—, —CH$_2$O—, —CH=N—, —N=CH=, —N=N—, —NO=N—, —N=NO—, —(CH$_2$)$_k$—CO—O— or a single bond, k is 1 to 6,
p is 0, 1 or 2, and
q is 0 or 1, or one of the groups R$^1$ and R$^2$ may also be H, with the proviso that the sum of m+p+q equals 1 to 15.

16. A method for reducing the refractive indexes of a liquid crystalline mixture, comprising adding to said mixture one or more partially fluorinated additives of formula I

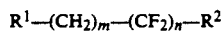

wherein m is 0 to 12, n is 2 to 12 and R$^1$ and R$^2$ each signify a group of formula

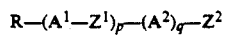

in which

R is F or straight-chain alkyl with 1–15 C atoms, it also being possible for one or two non-adjacent CH$_2$ groups to be replaced by —O—, —CO—, —O—CO—, —CO—O, —O—CO—O, —C≡C— and/or —CH=CH—, A$^1$ and A$^2$ are in each case (1) an unsubstituted or mono- or polysubstituted 1,4-cyclohexylene group, it also being possible for one or two non-adjacent CH$_2$ groups to be replaced by —O— and/or —S—, (2) a 1,4-bicyclo[2,2,2]octylene group, or (3) a 1,4-phenylene group which is unsubstituted or substituted by one or two F and/or Cl atoms and/or CH$_3$ groups and/or CN groups, it also being possible for one or two CH groups to be replaced by N, —CO—O—, —O—CO—, —CH$_2$CH$_2$—, —CH-CN—CH$_2$—, —CH$_2$—CHCH—, —CH=CH—, —C≡C—, —OCH$_2$—, —CH$_2$O—, —CH=N—, —N=CH—, —N=N—, —NO=N—, N=NO— or a single bond, Z$^2$ is —CO—O—, —O—CO—, —CH$_2$CH$_2$—, —CH-CN—CH$_2$—, CH$_2$—CHCH—, —CH=CH—, —C≡C—, —OCH$_2$—, —CH$_2$O—, —CH=N—, —N=CH=, —N=N—, —NO=N—, —N=NO—, —(CH$_2$)$_k$—CO—O— or a single bond, k is 1 to 6,
p is 0, 1 or 2, and
q is 0 or 1, or one of the groups R$^1$ and R$^2$ may also be H, with the proviso that the sum of m+p+q equals 1 to 15.

* * * * *